US008532225B2

(12) United States Patent
O'Keeffe et al.

(10) Patent No.: US 8,532,225 B2
(45) Date of Patent: Sep. 10, 2013

(54) DC COMPENSATION FOR VLIF SIGNALS

(75) Inventors: Conor O'Keeffe, Cork (IE); Norman Beamish, Cork (IE); Richard Verellen, Poplar Grove, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 157 days.

(21) Appl. No.: 12/919,536

(22) PCT Filed: Mar. 19, 2008

(86) PCT No.: PCT/IB2008/051036
§ 371 (c)(1),
(2), (4) Date: Aug. 26, 2010

(87) PCT Pub. No.: WO2009/115863
PCT Pub. Date: Sep. 24, 2009

(65) Prior Publication Data
US 2011/0007847 A1    Jan. 13, 2011

(51) Int. Cl.
*H04L 25/06* (2006.01)
(52) U.S. Cl.
USPC ........... 375/319; 375/261; 375/316; 375/320; 375/322; 375/324; 375/346; 455/63.1; 455/130; 455/296; 455/313; 455/314; 329/318; 329/320; 327/307; 327/551
(58) Field of Classification Search
USPC ................. 375/261, 316, 319, 320, 322, 324; 455/63.1, 130, 296, 313, 314; 327/307; 329/318, 320
See application file for complete search history.

(56) References Cited

U.S. PATENT DOCUMENTS

| 6,148,039 | A | 11/2000 | Coman et al. |
|---|---|---|---|
| 7,136,431 | B2 | 11/2006 | Shi et al. |
| 7,277,688 | B2 * | 10/2007 | Yang et al. ..................... 455/296 |
| 2002/0155822 | A1 * | 10/2002 | Adachi ......................... 455/293 |
| 2003/0148750 | A1 | 8/2003 | Yan et al. |
| 2005/0009493 | A1 | 1/2005 | Yang et al. |
| 2006/0205376 | A1 | 9/2006 | Brobston et al. |
| 2008/0133636 | A1 | 6/2008 | Beamish et al. |
| 2009/0075612 | A1 * | 3/2009 | Keehr et al. ................ 455/226.1 |
| 2010/0173601 | A1 | 7/2010 | Beamish et al. |

FOREIGN PATENT DOCUMENTS

WO    02/062093 A1    8/2002

OTHER PUBLICATIONS

Hietala Alex W: "A Quad-Band 8PSK/GMSK Polar Transceiver" IEEE Journal of Solid-State Circuits, vol. 41, No. 5, pp. 1133-1141, May 2006.
International Search Report and Written Opinion correlating to PCT/IB2008/051036 dated Feb. 16, 2009.

* cited by examiner

Primary Examiner — Leon Flores

(57) ABSTRACT

Receiver circuitry for processing a received Very Low Intermediate Frequency signal wherein the receiver circuitry comprises a main processing path. The main processing path comprises mixing circuitry arranged to mix a received VLIF signal with a frequency down conversion signal to produce a main path signal. The receiver circuitry further comprises a direct current cancellation path comprising mixing circuitry arranged to mix a DC element of the received VLIF signal with the frequency down conversion signal to produce a DC cancellation signal. The receiver circuitry still further comprises signal summing circuitry arranged to add the DC cancellation signal in anti-phase with the main path signal.

20 Claims, 6 Drawing Sheets

DC COMPENSATION FOR VLIF SIGNALS

FIELD OF THE INVENTION

The invention relates to a receiver circuitry for processing a received Very Low Intermediate Frequency (VLIF) signal, to an integrated circuit including receiver circuitry, to a wireless communication unit and to a method for processing a received Very Low Intermediate Frequency (VLIF) signal.

BACKGROUND OF THE INVENTION

In the field of cellular communication systems, communication devices, such as wireless telephone handsets, transmit and receive modulated Radio Frequency (RF) signals. For example, the Universal Mobile Telecommunications System (UMTS) system, developed by the 3$^{rd}$ Generation Partnership Project (3GPP) (www.3gpp.org), utilises Wideband Code Division Multiple Access (W-CDMA) modulation.

Upon receipt of such modulated RF signals, communication devices perform various amplification, filtering, mixing/conversion operations in order to extract wanted information from the received signals. For many applications, Very Low Intermediate Frequency (VLIF) receivers are used because the wanted down converted received signal that is digitised is not centred about DC (zero hertz). In this manner, DC offset removal can be performed in the digital domain without notching out centre channel power of the desired signal: a problem with Zero Intermediate Frequency (ZIF) receivers.

In many applications, the received signal is offset from DC so as to avoid 1/f noise (flicker noise) associated with signals about DC in the analogue domain. Furthermore, VLIF receivers also allow improved processing gain performance to interferers which manifest as IIP2 distortion, which is centred about DC. As will be known by a skilled artisan, IIP2 is a measure of the 2$^{nd}$ order intermodulation product of the receiver subsystem. For radio receivers, the most prevalent 2$^{nd}$ order distortion term is a result of self mixing interferer signals, the main resultant term for which is a DC component. Given the Time Division Multiple Access (TDMA) basis of many air interface protocols, this interferer may not be present during initialisation of the receiver circuits on a mobile radio communications device, and thus can not be calibrated out. Accordingly, the radio receiver must deal with abrupt changes to DC levels as pulsed interferers appear during reception. Furthermore as many modern air interface communication protocol use an Amplitude Modulation (AM) component, this AM term becomes centred on DC as a result of IIP2 distortion.

FIG. 1 illustrates an example of typical VLIF RF receiver circuitry 100 for such a communication device. Signals are received by an antenna 110. A transceiver switch 120 operably couples the antenna 110 to transceiver circuitry comprising a transmit chain 130 and a receive chain. During reception of a signal, the switch 120 isolates the antenna 110 from the transmit chain 130, and couples it to the receive chain. Typically for more recent receiver circuits, it is desirable for the processing of received signals to be performed in the digital domain, in order to improve the reliability of such processing. Accordingly, for the example illustrated in FIG. 1, the receive chain comprises digital processing circuitry 170. However, it is still necessary for some processing to be performed within the analogue domain. Accordingly, the receive chain further comprises a low noise amplifier LNA 140 for amplifying the received RF signal, a quadrature mixer 150 for producing In-phase (I) and Quadrature (Q) components of the received signal, and baseband filters 160. For the example illustrated in FIG. 1, the digital processing circuitry 170 is operably coupled to a baseband central processing unit (CPU) 180, and provides the information retrieved from the received signal thereto. However, in alternative examples, the digital processing circuitry 170 may form a part of the baseband CPU 180 integrated circuit device.

A problem encountered with processing received signals is that, as mentioned above, analogue signal processing inherently introduces DC offsets into a received signal. These digital offsets are then passed from the analogue domain on to the digital domain, and as a result have an effect on the received signal in a form of unwanted tones during the subsequent digital signal processing.

FIG. 2 illustrates an example of known digital signal processing circuitry 200, such as the digital processing circuitry 170 of FIG. 1. The digital signal processing circuitry 200 comprises, for each of the In-phase and Quadrature component paths, a Sigma-Delta analogue to digital converter (ADC) 210, and a down sampling sinc filter 215. The digital signal processing circuitry 200 also comprises amplitude IQ imbalance correction circuitry 220, image cancellation mixer circuitry 230, anti-alias filter (AAF) 235, downsampler 240, Channel selectivity filter 245 and digital RF interface 270 for providing an interface to, for example, the baseband DSP 180 in FIG. 1.

As previously mentioned, a problem encountered with processing received signals is that of the DC offsets introduced into the received signal during the analogue processing, and which are then passed on to the digital signal processing circuitry. As will be understood by a skilled artisan, any DC offset present within the signal during the image cancellation performed by the image cancellation mixer circuitry 230 will appear as tones at the intermediate frequency following the image cancellation, which cause interference with the wanted signal. As will also be appreciated by a skilled artisan, this is particularly problematic for very low intermediate frequency (VLIF) receivers.

The known solution illustrated in FIG. 2 for handling these DC offsets comprises, using a fine DC offset correction filter (high pass filter) 250 located in each of the In-phase and Quadrature component paths, before the signal reaches the IQ imbalance correction circuitry 220 and image cancellation mixer circuitry 230.

A problem with the use of such DC offset correction filters is that, because of their low bandwidths, they suffer from slow settling time responses. Consequently, the residual DC settling interferes with the wanted signal. If the bandwidth of the DC offset correction filter is increased in order to reduce the DC settling time, then this interferes with channel selectivity filtering within VLIF receivers. Consequently, the receiver circuitry is required to be switched on early, in the receiving and signal processing process in order to allow the DC filters time to settle. As a result, the receiver circuitry is required to be switched on for longer periods of time, and therefore increases the power consumption.

Furthermore, adjacent timeslot power levels will cause initial problematic sampled DC impulse. To those skilled in the art it will be appreciated that, while a radio receiver is enabled for reception, a DC offset calibration scheme may be invoked. While this calibration scheme is running, an adjacent time slot of transmission from the base station will be present on the air interface. This signal may have a very different power level to the one intended for the given receiver. This variation in power level may distort the DC offset calibration result of the receiver.

US Patent US20050009493(A1), "DC Offset correction for Very Low Intermediate Frequency Receivers" Yang et al.

Jan. 13, 2005 (YANG), discloses a method of down converting an RF information signal to a baseband information signal is such a manner as to overcome the above mentioned problems experienced during DC offset removal within, for example, VLIF receivers. More particularly, this patent discloses two embodiments for removing the DC offset within a received signal. The first embodiment comprises digitising an entire received VLIF signal burst, and having digitised the entire signal burst, estimating the DC content of the entire burst. The DC estimate is then subtracted from the VLIF signal burst before down converting the signal from being VLIF centred to being DC centred. The second embodiment again comprises digitising an entire received VLIF signal. However, for the second embodiment, the estimation of the DC content, and the subtracting of the DC estimate from the received signal burst, is performed after down converting the signal from being VLIF centred to being DC centred.

However, a problem with each of the two embodiments disclosed in US20050009493 is that they both require the entire burst to be digitised before correcting the DC offset within the VLIF signal. Accordingly, it is not possible for the received signal to be processed in real time, since it inherently requires the received signal to be delayed whilst the entire signal burst is received, processed and used to estimate the DC content therefore. Only then may the DC content be removed, and the signal processed further. Such a delay in the processing of received signals is substantially incompatible with the increase in modem performance requirements.

SUMMARY OF THE INVENTION

The present invention provides a receiver circuitry, an integrated circuit, a wireless communication unit and a method as described in the accompanying claims. Specific embodiments of the invention are set forth in the appended claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DESCRIPTION OF EMBODIMENTS

Although examples of embodiments of the invention will be hereinafter described in terms of receiver circuitry comprising digital processing circuitry, it will be appreciated that the embodiments herein described may be embodied in any apparatus that incorporates receiver circuitry for processing a received Radio Frequency (RF) signal.

In an example, a method and apparatus for processing a received Very Low Intermediate Frequency (VLIF) signal may comprise mixing a received VLIF signal with a conversion signal to produce a main path signal. A direct current (DC) element of the received VLIF signal (for example a dc offset signal in a parallel path to the main path signal) may be obtained, for example substantially concurrently with mixing the received VLIF signal with a conversion signal to produce the main path signal, and mixed the DC element of the received signal with the conversion signal to produce a DC cancellation signal. Thereafter, the DC cancellation signal is added in anti-phase with the main path signal. In this manner, latency in channel selectivity filtering may be achieved to enable more time to increase an accuracy of DC measurement, relative to a system that measures the DC offset in the main signal path VLIF signals may include zero IF (ZIF) signals produced in a direct conversion receiver (DCR) implementation. Thus, in the context of examples described hereafter, the term VLIF encompasses DCR implementations.

Figure 1:
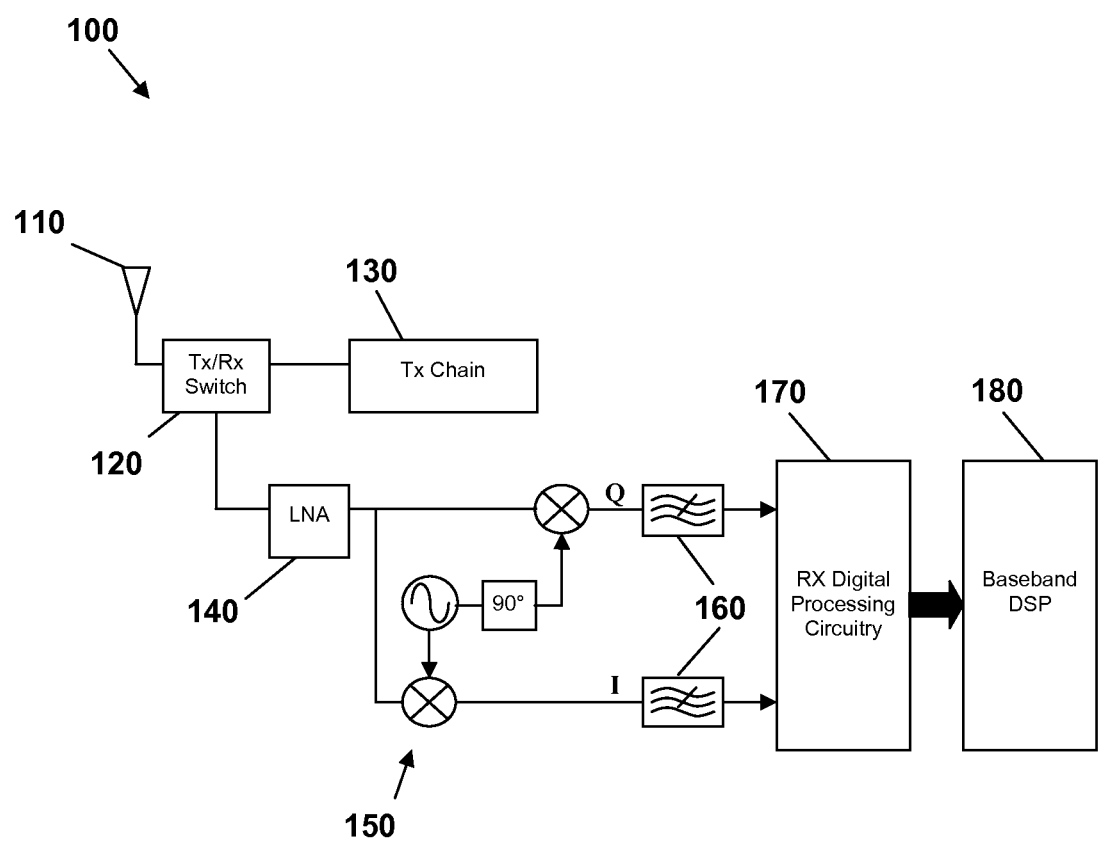
FIG. 1 illustrates an example of RF receiver circuitry as known in the art.
Figure 2:
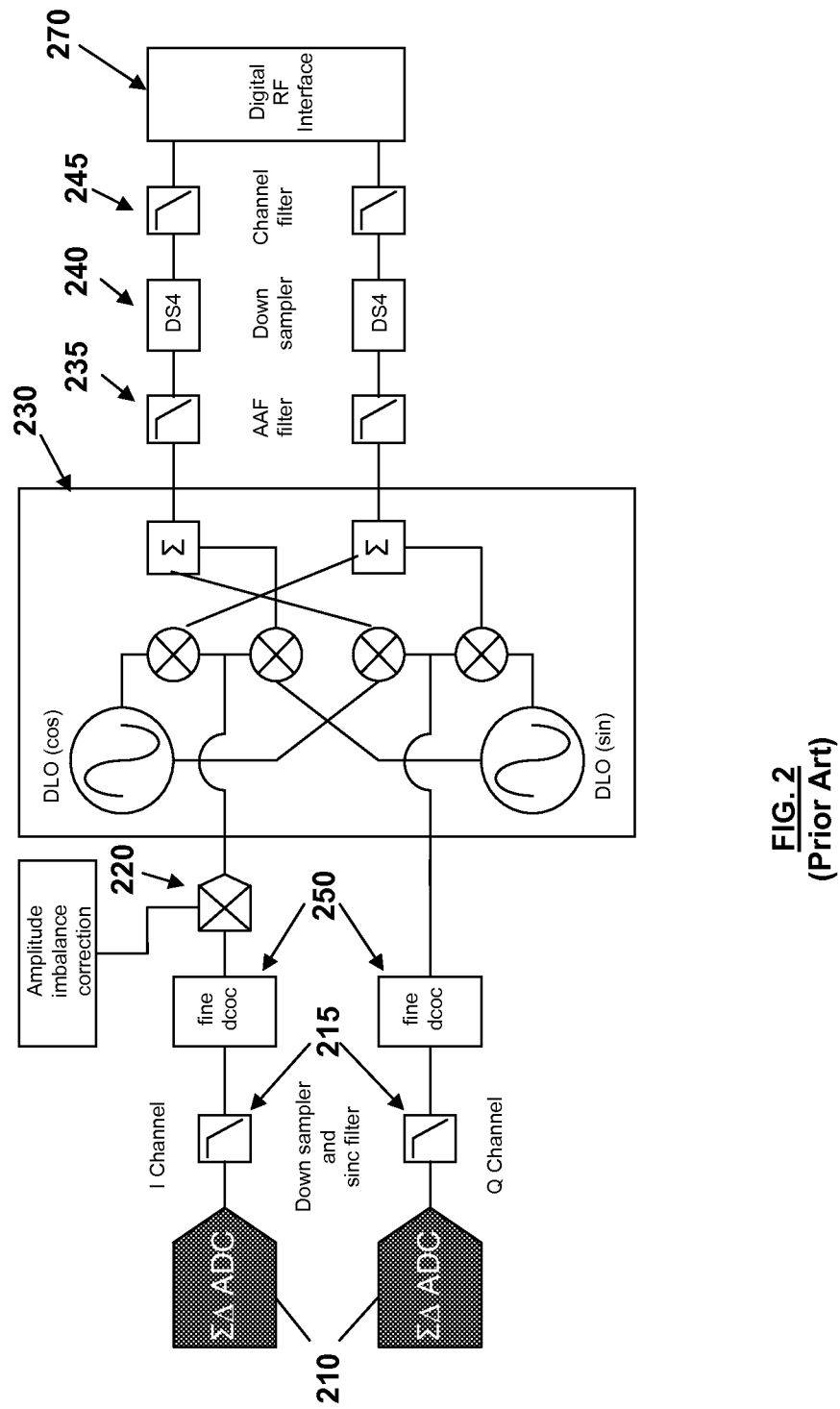
FIG. 2 illustrates an example of known digital signal processing circuitry, such as the digital processing circuitry of FIG. 1.
Figure 3:
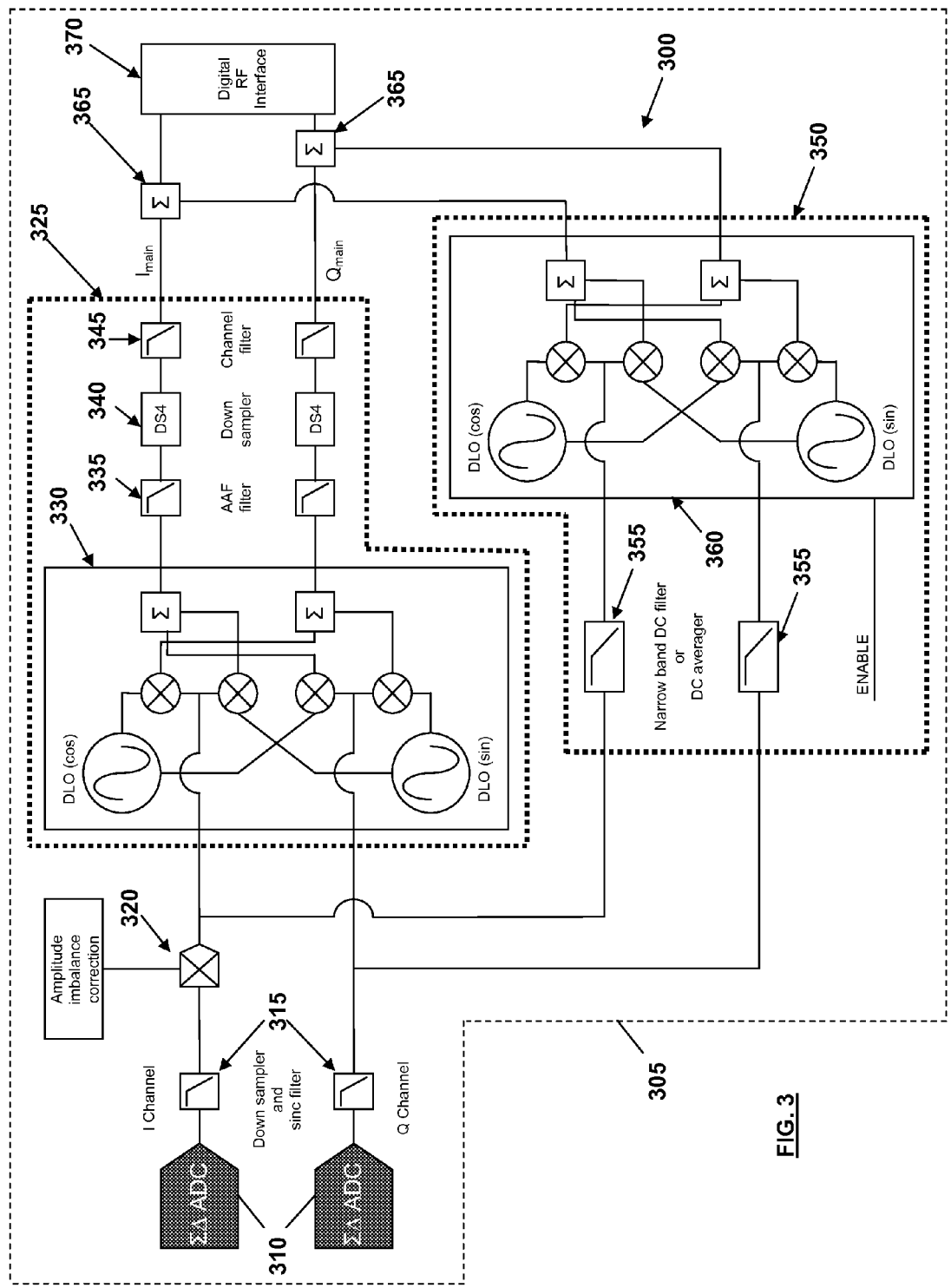
FIG. 3 illustrates receiver circuitry for processing a received Radio Frequency (RF) signal according to a first example of an embodiment of the invention.

Referring now to FIG. 3, there is illustrated an example of receiver circuitry 300 for processing a received Very Low Intermediate Frequency (VLIF) signal. As will be appreciated by a skilled artisan, a VLIF signal comprises a received Radio Frequency (RF) signal that has been down converted such that the wanted components of the received signal are generally centred about a very low intermediate frequency. Typically, for GSM (Global System for Mobile communications), including EDGE (Enhanced Data rates for GSM Evolution), and GPRS (General Packet Radio Service) reception, a VLIF may be in the order of 100 kHz to 200 kHz, exploiting the relaxed Adjacent channel selectivity requirement imposed by 3GPP. In GPS (Global Positioning System) applications, a 1 MHz to 3 MHz VLIF range is normally utilised.

For the illustrated embodiment, the receiver circuitry 300 is in a form of digital signal processing circuitry forming part of an integrated circuit 305. Accordingly, the receiver circuitry 300 comprises analogue to digital converter circuitry in a form of a pair of Sigma-Delta analogue to digital converters (ADC) 310, arranged to receive, as an input, In-phase (I) and Quadrature (Q) components of a received VLIF signal. It should be noted that different ADC types other than Sigma Delta could be employed in the receiver.

Sigma-Delta ADCs have high oversample rates with respect to the wanted signal. For example, the ADC sampling rates may be in the region of 26 MHz to 52 MHz where the sample bandwidth is less than 1 MHz. Accordingly, the output from the Sigma-Delta ADCs 310 is typically just one or two bits at the sample rate. A Sinc (down sampling) filter 315 is coupled to the output of each of the Sigma-Delta ADCs 310 to reduce the sample rate. For example, the Sinc filters 315 may reduce the sample rates to a region of 2.16 MHz to 4.33 MHz.

IQ amplitude imbalance correction circuitry 320 is then provided, which for the illustrated embodiment is in a form of a multiplier applied to one of the In-phase and Quadrature component paths. In this manner, the composite gains of the I path and the Q path can be matched, correcting any gain mismatch introduced within the analogue domain.

The receiver circuitry 300 comprises a main processing path 325, a DC cancellation path 350, and signal summing circuitry 365. The main processing path 325 comprises mixing circuitry 330 arranged to mix a received VLIF signal with a conversion signal to produce a main path signal. In particular, for the illustrated embodiment the mixing circuitry 330 is arranged to mix the received VLIF signal with a very low intermediate frequency (VLIF) conversion signal, such that wanted components of the received signal are shifted from being substantially centred about the very low intermediate frequency to being substantially centred about zero hertz (DC).

The DC cancellation path 350 may for example comprise quadrature mixing circuitry 360, as shown in FIG. 3, arranged to mix a DC element of the received signal with the conversion signal to produce a DC cancellation signal. The signal summing circuitry 365 is arranged to add the DC cancellation signal in anti-phase with the main path signal.

As can be seen, DC offsets introduced into the received signal during analogue signal processing are not filtered out, prior to the main path quadrature mixing circuitry 330 mixing the received signal with a conversion signal to shift the wanted elements of the received signal to be substantially centred about DC. The mixing of the received signal with the conversion signal results in any DC offset that is present within the received signal being converted into unwanted tones within the main path signal.

The mixing of the DC element of the received signal with the conversion signal by the mixing circuitry 360 of the DC cancellation path 350 results in the DC cancellation signal comprising corresponding tones to those unwanted tones that are present within the main path signal. Thus, by adding the DC cancellation signal in anti-phase with the main path signal, the tones present within the DC cancellation signal substantially counteract the unwanted tones within the main path signal. By adding the DC cancellation signal in 180° anti-phase, the unwanted tones may be substantially completely removed, or at least be reduced, and thereby removing the effects of the DC offset introduced to the received signal during analogue signal processing.

The main processing path 325 of the receiver circuitry 300 for the illustrated embodiment comprises further filtering and downsampling circuitry in the form of Anti-Alias Filters (AAF's) 335, downsamplers 340 and channel selectivity filters 345. In this manner, the further filtering and downsampling, and in particular the channel selectivity filtering, is also performed in parallel with the DC cancellation path 350.

By performing the DC cancellation in parallel in this manner, any DC interference is allowed to remain with the signal all the way through the main processing path until the output of the selectivity filter. This allows the parallel DC estimation system a longer time to accurately determine the DC offset before it is removed from the main processing path.

In this manner, the effects of a DC offset introduced into a received signal can be substantially alleviated without a need to use DC notch filters in series with the processing of the wanted components of the received signal. Consequently, the slow settling time responses inherent in such DC filters, due to their low bandwidth of operation, and the problems resulting therefrom, may be substantially avoided. Consequently, the receiver circuitry is not required to be switched on early in order to allow DC filters to settle, resulting in the receiver circuitry being able to be switched on for shorter periods of time, reducing the power consumption thereof.

The DC cancellation path 350 and the main processing path 325 may comprise similar phases, such that the unwanted tones within the main processing path 325 are cancelled effectively by the tones within the DC cancellation path 350. This may be achieved by offsetting the starting phase of the DLO in the mixing circuitry 360 of the DC cancellation path 350 by the latency of the channel selectivity filters 345, down sampler 340 and AAF 335 on the main processing path 325. For example, this may be achieved by staggering the start time of the mixing circuitry 360 of the DC cancellation path 350 with the mixing circuitry 330 of the main processing path 325. Alternatively, an appropriate phase offset may be added to the mixing circuitry 360 of the DC cancellation path 350.

As will be appreciated by a skilled artisan, the composite filter response of the selectivity filter and the AAF filter may scale the amplitude of the DC induced resultant VLIF tones at its output. Consequently, a scaling function (not shown), substantially equal to the scaling function on the main processing path 325, may be placed on the DC cancellation path 350. No latency would be incurred for such a function.

For the example illustrated in FIG. 3, the DC cancellation path 350 further comprises circuitry 355 for obtaining the DC element of the received signal which is to be mixed with the conversion signal to produce a DC cancellation signal. The circuitry 355 may for example comprise narrow band filtering circuitry arranged to substantially filter out non-DC elements of the received signal. As previously mentioned, since such narrow band filtering is performed in parallel with the processing of the wanted components within the main processing path 325, the processing of the wanted components is substantially unaffected by any settling of the narrow band filters. Alternatively, the circuitry 355 may comprise DC averaging circuitry. For example, this DC averaging circuitry may comprise a low pass filter on the respective I and Q paths. The required phase and/or gain offsets for the DC correction path may be calculated from the coefficients of the main processing path filters.

For the illustrated embodiment, the output of the signal summing circuitry 365 is provided to a digital interface 370, which provides an interface for a baseband signal processor (not shown) or the like. However, as will be appreciated by a skilled artisan, the baseband signal processor may be provided on the same semiconductor device, in which case the output of the signal summing circuitry 365 may be provided directly to the baseband signal processor without a need for a digital RF interface 370.

As will be appreciated by a skilled artisan, the mixing circuitry 360 of the DC cancellation path 350 does not need to provide the same bit accuracy as the mixing circuitry 330 of the main processing path 325, since the dynamic range of signals to be considered is much reduced for the DC cancellation path 350.

Furthermore, for the illustrated embodiment, a 0 dB gain is assumed on the Digital Local Oscillators (DLOs) of the mixing circuitry 360. However, this may not be the case. Accordingly, a gain stage may be added to the DC cancellation path 350 so that any change in amplitude of the DLO tone frequency through the main signal path may be matched.

Furthermore, and as mentioned above, it is contemplated that the group delay of the Anti-Aliasing Filter (AAF) 335 and the channel selectivity filter 345 within the main processing path 325 may be used, via an Enable input of the mixing circuitry 360 of the DC cancellation path 350, to ensure appropriate timing of the phase of the DC cancellation signal relative to that of the main path signal.

Figure 4:
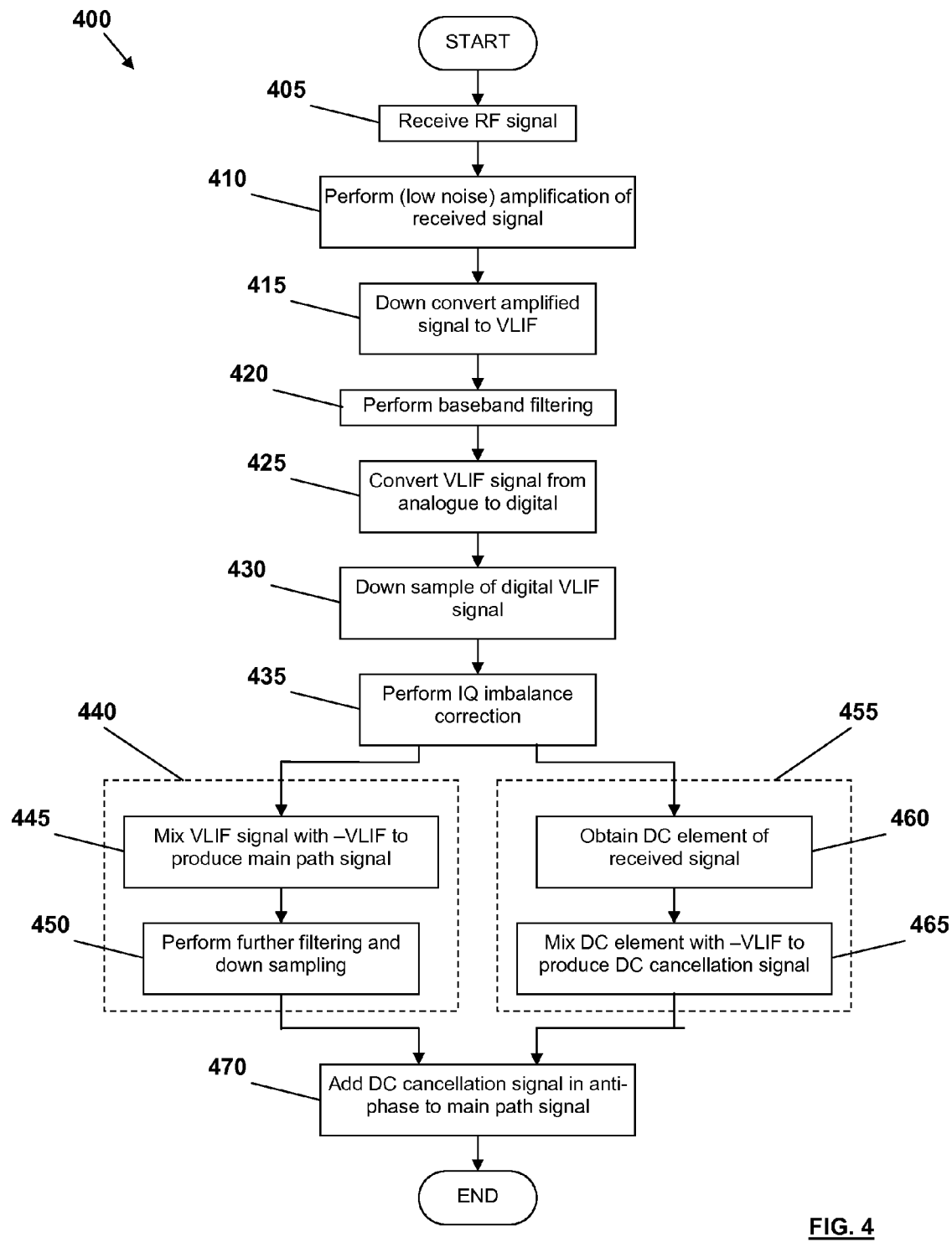
FIG. 4 illustrates a flow chart of a method for processing a received Radio Frequency (RF) signal according to an example of an embodiment of the invention.

Referring now to FIG. 4, there is illustrated a flow chart 400 of a method for processing a received Very Low Intermediate Frequency (VLIF) signal according to some embodiments of the invention. The method starts as indicated with reference number 405 with a receipt of an RF signal. Next, as indicated with reference number 410, low noise amplification of the received signal is performed, followed by down converting the amplified signal to a Very Low Intermediate Frequency (VLIF) signal, as indicated with reference number 415. Baseband filtering is then performed on the VLIF signal as indicated with reference number 420, before converting the VLIF received signal from an analogue to digital format as indicated with reference number 430. The digital signal is then downsampled as indicated with reference number 430, and IQ imbalance correction is performed on in-phase and quadrature components of the received signal as indicated with reference number 435.

The method comprises a main processing flow 440, which for the illustrated embodiment starts after performing IQ imbalance correction. The main processing flow 440 comprises mixing the received signal, with a conversion signal, as indicated with reference number 445, to produce a main path signal, which for the illustrated embodiment comprises shifting the frequency of a wanted element of the VLIF signal to be substantially centred about zero hertz (DC). In accordance with some embodiments of the invention, the main processing flow 440 further comprises performing additional filtering, such as anti-aliasing filtering and channel selectivity filtering, and down sampling, as illustrated as indicated with reference number 450.

As will be appreciated by a skilled artisan, DC offsets introduced into the received signal during analogue processing are not filtered out prior to the mixing of the received signal with the conversion signal to shift the wanted elements of the received signal to be substantially centred about DC. As a result, any DC offset present within the received signal may be converted into unwanted tones within the main path signal.

The method further comprises a DC correction flow 455, performed substantially concurrently with the main processing flow 440. The DC correction flow 455 comprises obtaining a DC element of the received signal, as indicated with reference number 460, and mixing the DC element with the conversion signal (used as indicated with reference number 445), to produce a DC cancellation signal, as indicated with reference number 465. As will be appreciated by a skilled artisan, the mixing of the DC element of the receives signal with the conversion signal results in the DC cancellation signal comprising tones corresponding to those unwanted tones present within the main path signal.

The main processing flow 440 and DC correction flow 455 of the method of FIG. 4 converge at step 470, in which the DC cancellation signal is added in anti-phase to the main path signal. In this manner, the tones present within the DC cancellation signal substantially counteract and thereby cancel only unwanted generated tones within the main path signal. As will be appreciated by a skilled artisan, by adding any DC cancellation signal in 180° anti-phase, the unwanted tones may be substantially removed, and thereby substantially removing the effects of the DC offset introduced to the received signal during analogue processing.

Once again, in this manner, the effects of a DC offset introduced to a received signal may be substantially alleviated without the need to use DC notch filters in series with the processing of the wanted components of the received signal. Consequently, the slow settling time responses inherent in such DC filters due to their low bandwidths, and the problems resulting therefrom, are substantially avoided. Consequently, the receiver circuitry is not required to be switched on 'early' in order to allow DC filters to settle. This results in the receiver circuitry being able to be switched on for shorter periods of time, thereby reducing the power consumption thereof.

Figure 5:
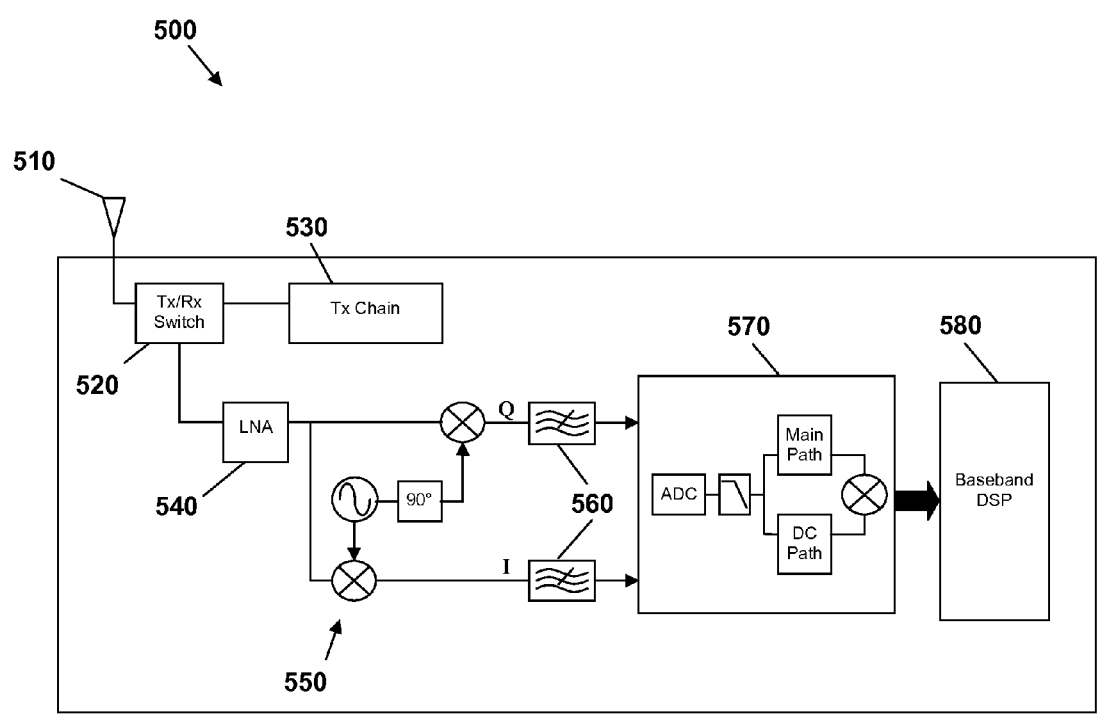
FIG. 5 illustrates a wireless communication unit adapted according to an embodiment of the invention.

Referring now to FIG. 5, there is illustrated an example of a wireless communication unit 500. Radio Frequency (RF) signals are received by an antenna 510 of the wireless communication unit 500. A transceiver switch 520 operably couples the antenna 510 to transceiver circuitry comprising a transmit chain 530 and a receive chain. During reception of a signal, the switch 520 isolates the antenna 510 from the transmit chain 530, and couples it to the receive chain. The receive chain comprises a low noise amplifier LNA 540 for amplifying the received RF signal, a quadrature mixer 550 for producing In-phase (I) and Quadrature (Q) components of the received signal and down converting the received RF signal to a VLIF signal, and baseband filters 560.

The receive chain further comprises digital processing circuitry 570. The digital processing circuitry comprises receiver circuitry for processing a VLIF signal, such as the receiver circuitry 300 of FIG. 3. More particularly, the receiver circuitry comprises a main processing path comprising mixing circuitry arranged to mix a received VLIF signal with a frequency down conversion signal to produce a main path signal. The receiver circuitry further comprises a DC cancellation path comprising mixing circuitry arranged to mix a DC element of the received VLIF signal with the frequency down conversion signal to produce a DC cancellation signal; and signal summing circuitry arranged to sum the DC cancellation signal in anti-phase with the main path signal.

The digital processing circuitry 570 is operably coupled to a baseband central processing unit (CPU) 580, and provides the information retrieved from the received signal thereto. However, in alternative embodiments, the digital processing circuitry 570 may form a part of the baseband CPU 580 integrated circuit device.

Figure 6:
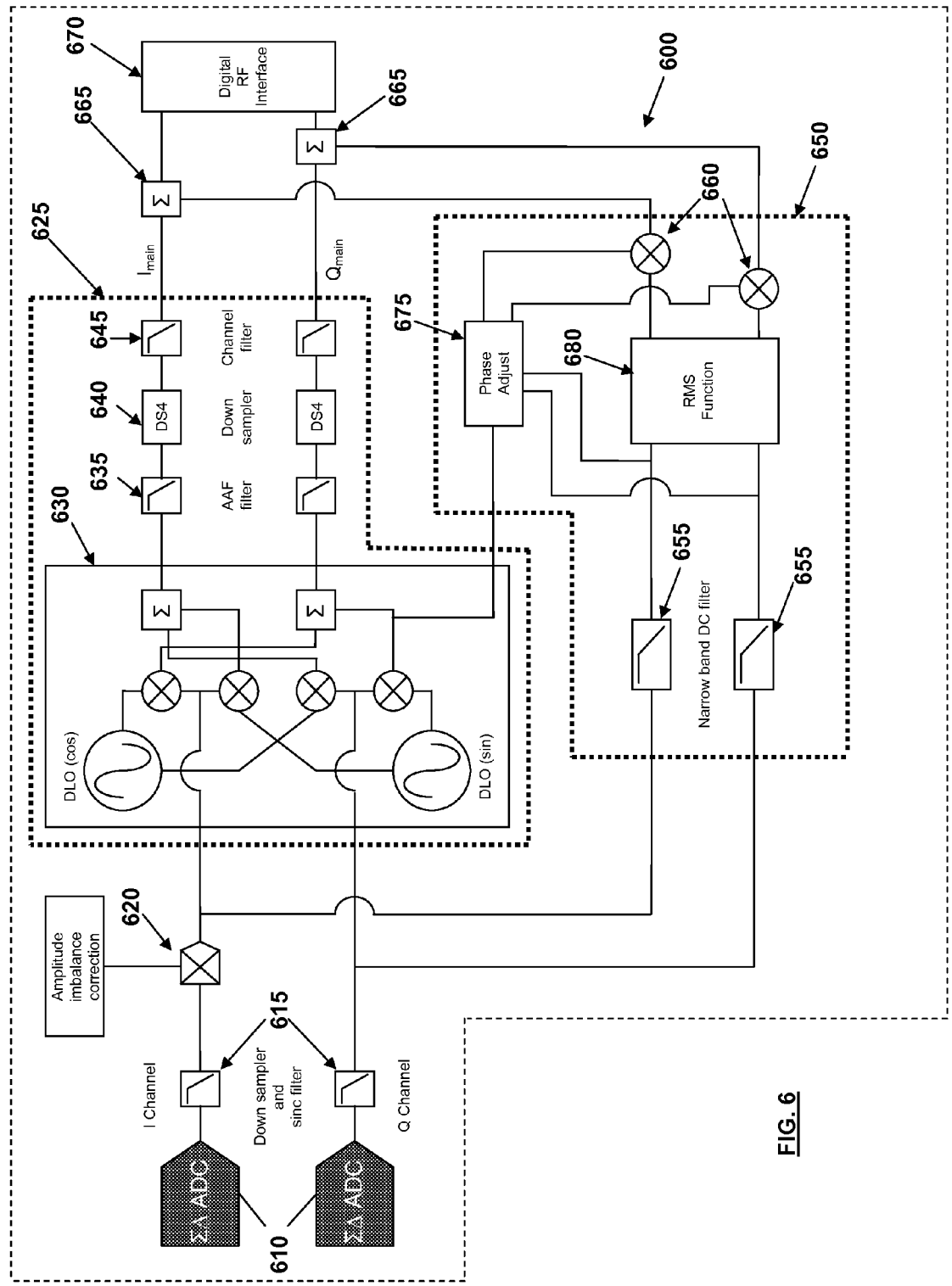
FIG. 6 illustrates receiver circuitry for processing a received VLIF signal according to a second example of an embodiment of the invention.

Referring now to FIG. 6, there is illustrated a second example of receiver circuitry 600 for processing a received VLIF signal. The receiver circuitry 600 comprises analogue to digital converter circuitry in a form of a pair of Sigma-Delta analogue to digital converters (ADC) 610, arranged to receive, as an input, In-phase (I) and Quadrature (Q) components of a received VLIF signal. A Sinc (down sampling) filter 615 is coupled to the output of each of the Sigma-Delta ADCs 610 to reduce the sample rate. 'IQ' amplitude imbalance correction circuitry 620 is then provided, which for the illustrated embodiment is in a form of a multiplier applied to one of the In-phase and Quadrature component paths. In this manner, the composite gains of the 'I' path and the 'Q' path can be matched, correcting any gain mismatch introduced within the analogue domain.

The receiver circuitry 600 comprises a main processing path 625, a DC cancellation path 650, and signal summing circuitry 665. The main processing path 625 comprises mixing circuitry 630 arranged to mix a received VLIF signal with a conversion signal to produce a main path signal. In particular, for the illustrated embodiment the mixing circuitry 630 is arranged to mix the received VLIF signal with a very low intermediate frequency (VLIF) conversion signal, such that wanted components of the received signal are shifted from being substantially centred about the very low intermediate frequency to being substantially centred about zero hertz (DC). The main processing path 625 of the receiver circuitry 600 for the illustrated embodiment comprises further filtering and downsampling circuitry in the form of Anti-Alias Filters (AAF's) 635, downsamplers 640 and channel selectivity filters 645. In this manner, the further filtering and downsampling, and in particular the channel selectivity filtering, is also performed in parallel with the DC cancellation path 650.

The DC cancellation path 650 comprises quadrature mixing circuitry 660 arranged to mix a DC element of the received signal with the conversion signal to produce a DC cancellation signal. The signal summing circuitry 665 is arranged to add the DC cancellation signal in anti-phase with the main path signal.

The mixing of the DC element of the received signal with the conversion signal by the mixing circuitry 660 of the DC cancellation path 650 results in the DC cancellation signal comprising corresponding tones to those unwanted tones that are present within the main path signal. Thus, by adding the DC cancellation signal in anti-phase with the main path signal, the tones present within the DC cancellation signal substantially counteract the unwanted tones within the main path signal. As will be appreciated by a skilled artisan, by adding the DC cancellation signal in 180° anti-phase, the unwanted tones may be substantially removed, and thereby removing the effects of the DC offset introduced to the received signal during analogue signal processing.

In the example illustrated in FIG. 6, the DC cancellation path 650 further comprises a Root Mean Square (RMS) function 680 arranged to scale the amplitude of the DC cancellation signal. In this manner, any change in amplitude of the DLO tone frequency through the main signal path 625 may be matched. For example, the RMS function may comprise an arithmetic calculation of the square root of the summation of I squared plus Q squared. For implementation purposes this could be limited to an MS (mean square) function whereby the square root function would not be considered but the magnitude of which is proportional to the total tone amplitude on the signal path. This value may then be used to set the magnitude of the tones needed for cancellation.

The DC cancellation path 650 further comprises phase adjustment logic 675, arranged to adjust the phase of the digital local oscillator (DLO) signal in proportion to the magnitude of the 'I' and 'Q' DC terms. For example, a Least Means Square (LMS) function may use the respective I and Q DC amplitudes to offset the phase of the cancellation tones such that it is in phase or anti-phase with the respective tones in the main processing path.

In a DCR example, it is possible to estimate a DC offset level in the parallel path and subtract the DC level at the selectivity filter output in a similar manner to the aforementioned VLIF embodiment.

It will be understood that the examples described above, may provide at least one, or more, of the following:
Substantially alleviating the effects of the DC offset within a received signal.
Substantially avoiding slow settling time responses inherent in such DC filters due to their low bandwidths.
Enabling receiver circuitry to be switched on for shorter periods of time, reducing the power consumption thereof.
Dynamic, real time removal of DC offset, avoiding delay in the processing of received signals.
Distortion due to high pass DC filter in receiver line up removed.

In particular, the examples hereinbefore described may be applied by a semiconductor manufacturer to any integrated circuit architecture supporting an improved method and apparatus for processing a received signal. It is further envisaged that, for example, a semiconductor manufacturer may employ the embodiments in a design of a stand-alone device, or application-specific integrated circuit (ASIC) and/or any other sub-system element employing an integrated circuit to support an improved method and apparatus for processing a received signal.

It will be appreciated that any suitable distribution of functionality between different functional units or controllers or memory elements, may be used without detracting from the embodiments herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the invention have been illustrated in connection with some examples of embodiments, it is not intended to be limited to the specific form set forth herein. It will be evident that various modifications and changes may be made therein without departing from the broader spirit and scope of the invention as set forth in the appended claims For example, the connections may be an type of connection suitable to transfer signals from or to the respective nodes, units or devices, for example via intermediate devices. Accordingly, unless implied or stated otherwise the connections may for example be direct connections or indirect connections.

Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

In the claims, any reference signs placed between parentheses shall not be construed as limiting the claim. The word 'comprising' does not exclude the presence of other elements or steps then those listed in a claim.

The invention claimed is:

1. A receiver circuitry for processing a received Very Low Intermediate Frequency signal, said receiver circuitry comprising:
a main processing path comprising mixing circuitry arranged to mix a received VLIF signal with a frequency down conversion signal to produce a main path signal; and
a direct current cancellation path comprising mixing circuitry arranged to mix a DC element of the received VLIF signal with the frequency down conversion signal to produce a DC cancellation signal; and
signal summing circuitry arranged to sum the DC cancellation signal in anti-phase with the main path signal.

2. The receiver circuitry of claim 1, wherein the DC cancellation path further comprises narrow band filtering circuitry arranged to filter out non-DC elements of the received signal to obtain the DC element of the received signal.

3. The receiver circuitry of claim 2, wherein the main processing path further comprises channel selectivity filtering.

4. The receiver circuitry of claim 2, wherein the DC cancellation path further comprises Root Mean Square logic arranged to scale the amplitude of the DC cancellation signal.

5. The receiver circuitry of claim 2, wherein the received signal comprises In-phase and Quadrature components.

6. The receiver circuitry of claim 2, wherein the receiver circuitry further comprises analogue to digital converter circuitry for converting the received signal from an analogue from to a digital form prior to mixing the received VLIF signal with the conversion signal to produce a main path signal.

7. The receiver circuitry of claim 1, wherein the DC cancellation path further comprises DC averaging circuitry arranged to filter out non-DC elements of the received signal to obtain the DC element of the received signal.

8. The receiver circuitry of claim 7, wherein the main processing path further comprises channel selectivity filtering.

9. The receiver circuitry of claim 7, wherein the DC cancellation path further comprises Root Mean Square logic arranged to scale the amplitude of the DC cancellation signal.

10. The receiver circuitry of claim 7, wherein the received signal comprises In-phase and Quadrature components.

11. The receiver circuitry of claim 1, wherein the main processing path further comprises channel selectivity filtering.

12. The receiver circuitry of claim 11, wherein the DC cancellation path further comprises Root Mean Square logic arranged to scale the amplitude of the DC cancellation signal.

13. The receiver circuitry of claim 1, wherein the DC cancellation path further comprises Root Mean Square logic arranged to scale the amplitude of the DC cancellation signal.

14. The receiver circuitry of claim 1, wherein the received signal comprises In-phase and Quadrature components.

15. The receiver circuitry of claim 14, wherein the DC cancellation path further comprises phase adjustment logic, arranged to adjust the phase of an oscillator signal in proportion to the magnitude of the I and Q DC terms.

16. The receiver circuitry of claim 1, wherein the receiver circuitry further comprises analogue to digital converter circuitry for converting the received signal from an analogue from to a digital form prior to mixing the received VLIF signal with the conversion signal to produce a main path signal.

17. The receiver circuitry of claim 1, wherein the mixing circuitry is arranged to mix the received signal with a frequency down conversion signal to produce a main path signal such that elements of the received signal are shifted to be centered at zero hertz.

18. An integrated circuit including receiver circuitry as claimed in claim 1.

19. A wireless communication unit comprising:
   receiver circuitry for processing a received Very Low Intermediate Frequency signal, said receiver circuitry comprising:
      a main processing path comprising mixing circuitry arranged to mix a received VLIF signal with a frequency down conversion signal to produce a main path signal; and
      a direct current cancellation path comprising mixing circuitry arranged to mix a DC element of the received VLIF signal with the frequency down conversion signal to produce a DC cancellation signal; and
      signal summing circuitry arranged to sum the DC cancellation signal in anti-phase with the main path signal.

20. A method for processing a received Very Low Intermediate Frequency signal comprising:
   mixing a received VLIF signal with a conversion signal to produce a main path signal;
   obtaining a DC element of the received VLIF signal;
   mixing the DC element of the received signal with the conversion signal to produce a DC cancellation signal; and
   adding the DC cancellation signal in anti-phase with the main path signal.

\* \* \* \* \*